C. T. ALEXANDER.
AUTOMOBILE AIR BRAKE.
APPLICATION FILED AUG. 16, 1918.
1,341,531.
Patented May 25, 1920.
3 SHEETS—SHEET 2.
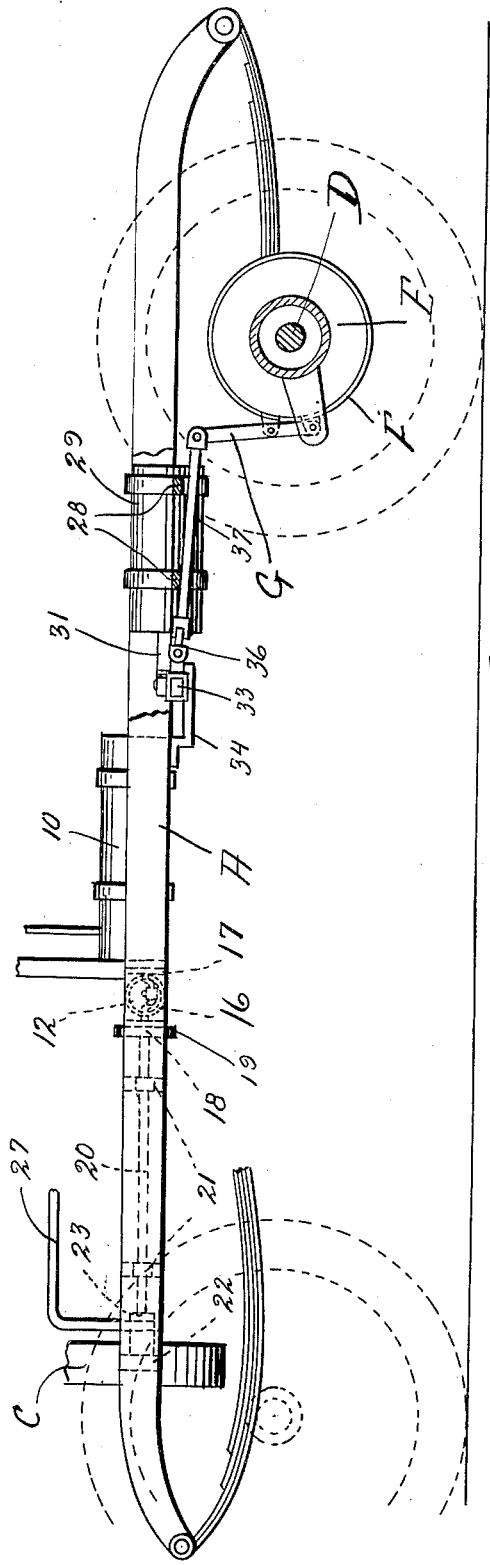
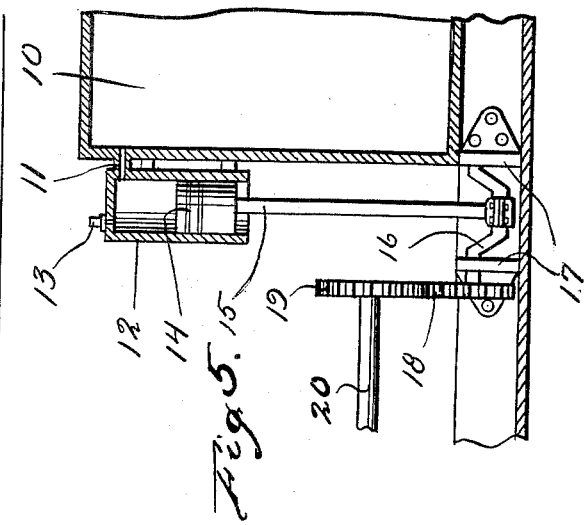
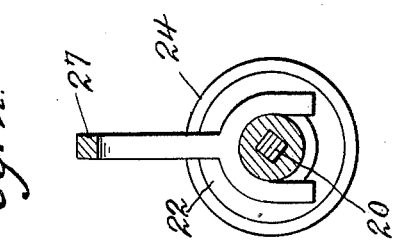
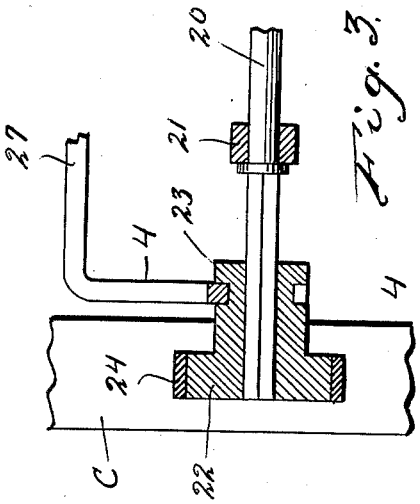
Inventor
Chester T. Alexander
By Victor J. Evans
Attorney

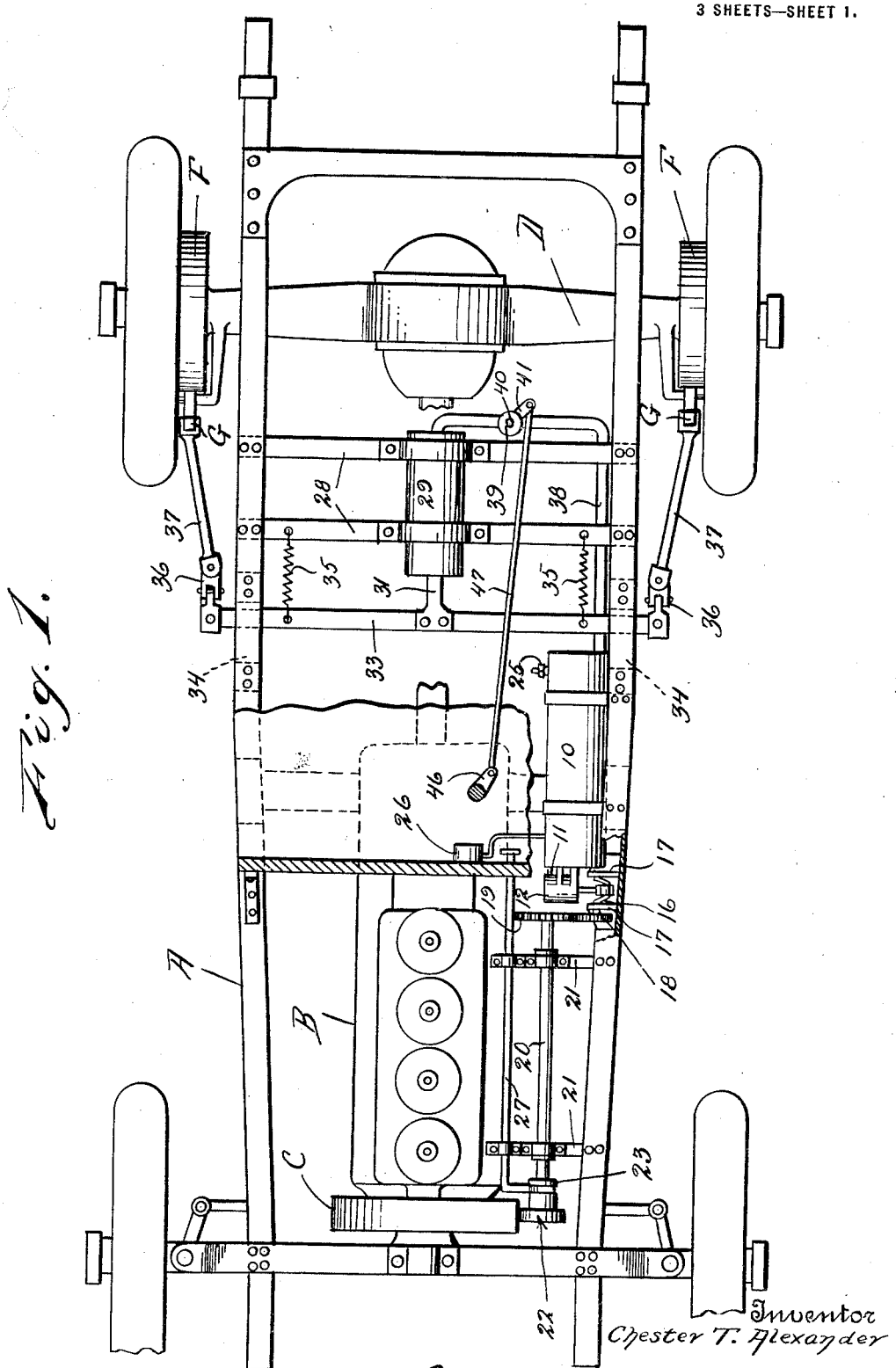

C. T. ALEXANDER.
AUTOMOBILE AIR BRAKE.
APPLICATION FILED AUG. 16, 1918.

1,341,531.

Patented May 25, 1920.
3 SHEETS—SHEET 3.

Inventor
Chester T. Alexander
By Victor J. Evans
Attorney

UNITED STATES PATENT OFFICE.

CHESTER T. ALEXANDER, OF VICTORIA, BRITISH COLUMBIA, CANADA.

AUTOMOBILE AIR-BRAKE.

1,341,531.     Specification of Letters Patent.     Patented May 25, 1920.

Application filed August 16, 1918. Serial No. 250,246.

*To all whom it may concern:*

Be it known that I, CHESTER T. ALEXANDER, a subject of the King of Great Britain, residing at Victoria, in the Province of British Columbia and Dominion of Canada, have invented new and useful Improvements in Automobile Air-Brakes, of which the following is a specification.

This invention relates to brake operating means, particularly to brake operating means for motor vehicles, and has for its object the provision of means adapted for attachment to the chassis of a motor vehicle whereby air may be compressed and stored and subsequently employed for operating a device to set the brakes.

An important object is the provision of an air brake of this character in which a single brake piston and cylinder are employed for setting both the brakes, an equalizer being used in connection with the brake piston whereby the tension on the different brake bands will be the same.

Another object is the provision of a device of this character embodying a pump having drive connection with the fly wheel of a motor whereby air may be compressed within the storage tank and maintained at any desired pressure, the pump being in operation at any time that the motor is running, and the driving connection between the fly wheel and the pump being disengageable at will whereby the pump may be maintained idle when desired.

A further object is the provision of a device of this character in which the control valve handle is located adjacent the driver's seat in convenient reach and so constructed and arranged as to admit air to the brake cylinder for setting the brakes and to permit the discharge of the compressed air within the brake cylinder for releasing the brakes.

Another object is the provision of a device of this character which is so constructed and arranged that by means of a single control valve the brakes may be set gradually for ordinary service or may be jammed on suddenly in case of emergency.

A further object is the provision of a device of this character which is so designed that it may be associated with the chassis of a motor vehicle without making extensive alterations or additions thereto and which is so proportioned and arranged as to occupy but little space thereon and which will be consequently comparatively simple and inexpensive in manufacture and installation, efficient and durable in use and a general improvement of the art.

With the above and other objects and advantages in view, the invention consists in the details of construction to be hereinafter more fully described and claimed, and illustrated in the accompanying drawings, in which:—

Figure 1 is a plan view of the chassis of a motor vehicle having my device applied thereto.

Fig. 2 is a side elevation with parts broken away to show the attachment more clearly.

Fig. 3 is a detail longitudinal sectional view through the pump shaft and its associated parts showing the slidable connection with the fly wheel.

Fig. 4 is a cross sectional view therethrough.

Fig. 5 is a detail sectional view showing the pump.

Figure 7:
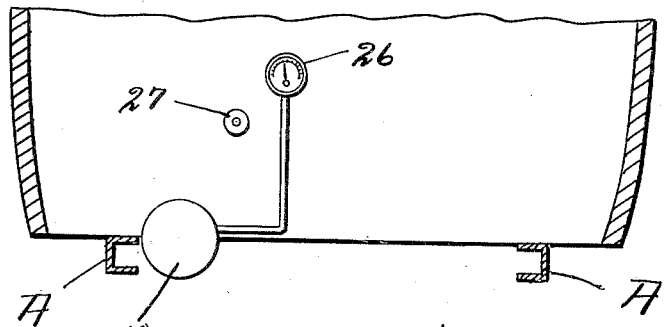
Fig. 7 is a cross sectional view taken through the forward portion of the automobile showing the controlling parts of the device.
Figure 6:
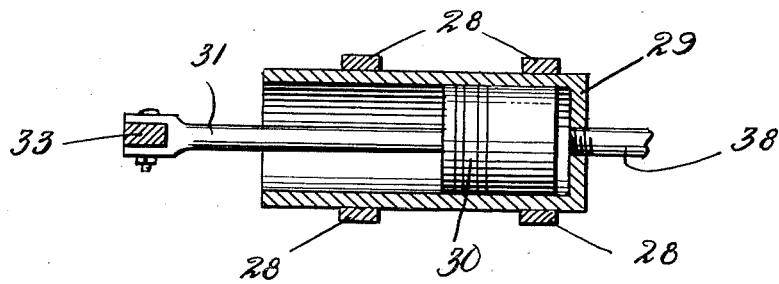
Fig. 6 is a detail sectional view through the brake cylinder and the associated parts.
Figure 8:
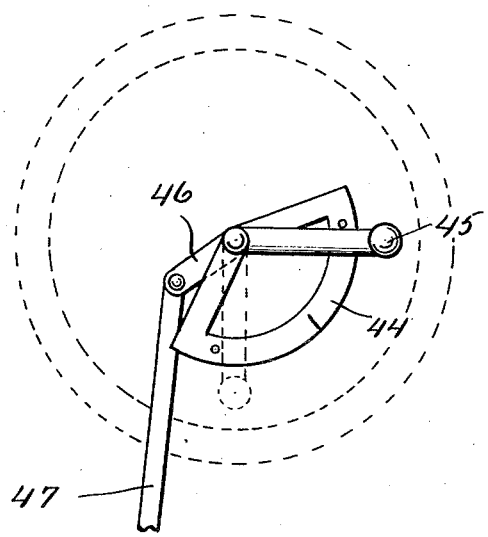
Fig. 8 is a plan view of the controller segment and handle.
Figure 9:
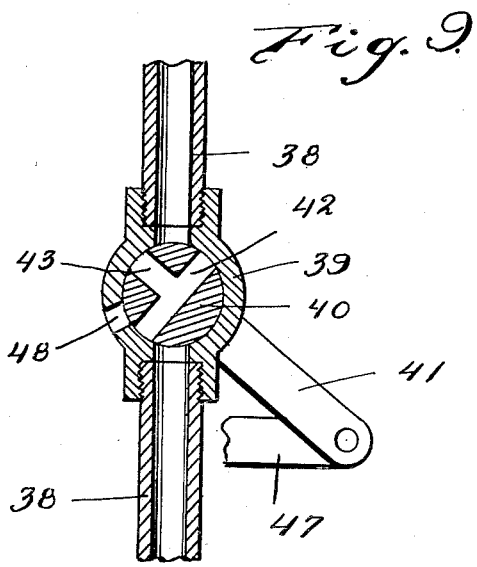
Fig. 9 is a detail sectional view through the controlling valve.

Referring more particularly to the drawing the letter A designates the chassis of a motor vehicle having the motor B, fly wheel C, rear axle D, and brake drums E. The brake drums E are provided with the usual brake bands F to which are connected the usual levers G for contracting the bands F about the drums. The above described parts are all well known portions of a motor vehicle and are illustrated for the sake of showing the application of my invention.

In carrying out my invention I provide a tank 10 secured upon some convenient location, preferably inwardly of and adjacent one side bar of the frame. Secured to the forward end of the tank 10 and communicating with the interior thereof by a passage 11, is a pump cylinder 12 provided with the usual air inlet 13 and having movable therein a piston 14 mounted on a connecting rod 15 carried by a crank shaft 16 journaled in suitable brackets 17 secured upon one side bar of the frame. In order that the pump may be operated, I provide upon the forward end of the crank shaft 16 a spur gear 18 having meshing therewith a similar spur gear 19 carried by a horizontally disposed shaft 20 journaled through suitable brackets 21 secured to the frame. At its forward end, the shaft 20 is squared and has slidable thereon a roller 22 carrying a grooved collar 23 and provided with a rubber tire 24 frictionally engaging the fly wheel C. When the motor B is in operation and the fly wheel C is rotated, engagement of the roller 22 with the fly wheel will rotate the shaft 20 and through the connections described will reciprocate the pist 14 for compressing air within the tank 10. The tank 10 is preferably provided with a safety valve 25 to relieve undue pressure and is also provided with a gage 26 mounted preferably upon the dash of the vehicle in a position to be seen easily by the driver.

In order that the operation of the pump may be discontinued when desired, I provide a rod 27 disposed longitudinally of the vehicle frame and having one end forked and engaging the grooved collar 23 carried by the roller 22 and having its other end slidable through the dash of the vehicle and provided with a handle disposed within convenient reach of the driver. By moving the rod 27, the roller 22 may be slid along the shaft 20 so as to be in or out of engagement with the fly wheel C depending upon whether the operation of the pump is desired or not.

Extending transversely of the rear portion of the chassis A are spaced supporting bars 28 upon which is secured a brake cylinder 29 having disposed therein a piston 30 from which extends a piston rod 31 connected at its forward end with an equalizer bar 33 extending transversely of the chassis 8 and slidable through guide brackets 34 secured upon the frame bars. Tension springs 35 are connected with the equalizer bar 33 and with the adjacent one of the supporting bars 28 for normally urging the piston 30 into the cylinder 29. The ends of the equalizer bar 33 are connected by universal joints 36 with pull rods 37 connected with the levers G which are provided for contracting the brake bands.

An air conducting pipe 38 communicates with the storage tank 10 and leads into the brake cylinder 29 rearwardly of the piston 30. A three-way valve 39 is interposed in the pipe 38 and includes a stem 40 carrying a lever 41 and provided with a transverse passage 42 and a branch passage 43. Secured upon some convenient location within the vehicle and within convenient reach of the driver, is a segment 44 which in the present instance is shown as secured upon the steering post. The segment 44 is provided with stops indicating different positions and has pivoted thereon an operating handle 45 with which is associated an arm 46 connected by a link 47 with the valve operating lever 41.

The operation of the device is as follows: With air in the tank 10 at the desired pressure, in order to set the brakes it is merely necessary that the driver grasp the handle 45 and move it to one limit of its movement upon the segment 44, whereupon by virtue of the rod or link 47 the valve stem 40 will be turned to the position permitting the transverse passage 42 to permit air to pass through the pipe 38 and into the brake cylinder 29. The pressure of the air within the cylinder 29 will force the piston 30 outwardly which will result in movement of the equalizer bar 33 in a forward direction against the resistance of the springs 35. This movement of the bar 33 will pull upon the rods 37 and consequently the levers G and will contract the bands F about the drums E. If it is desired to apply the brakes slowly, as in ordinary service, the handle 45 is moved slowly and in the event that it is necessary to effect a sudden stopping of the vehicle, the handle 45 is moved very quickly so that the air may pass from the storage tank into the brake cylinder with rapidity. After the brakes have been set, the operator may move the handle 45 to its intermediate position, whereupon the valve stem 40 will be moved so that the transverse passage 42 will not register with the bore of the pipe 38, whereupon the air pressure will be cut off while still allowing the brakes to remain set, as for holding the vehicle in locked position. When it is desired to relieve the brakes, the operator grasps the handle 45 and moves it to the other limit of its movement whereupon the stem 40 will be turned so that one end of the transverse passage 42 will register with an atmosphere port 48 in the valve 39 and the branch passage 43 will register with the bore of the pipe 38, whereupon air pressure from the tank 10 will not only be cut off but the air within the brake cylinder 29 will be permitted to escape into the atmosphere. This release of the pressure within the cylinder 29 will permit the springs 35 to return the equalizer bar 33 to its initial position whereupon the levers G will be moved to their original positions, resulting in disengagement of the brake bands F from the drums E.

From the foregoing description and a study of the drawings it will be apparent that I have thus provided air pressure operated means for setting the brakes of a motor vehicle either slowly or quickly as desired, the device being extremely easily controlled and obviously simple and effective.

While I have shown and described the preferred embodiment of the invention, it will of course be readily understood that I reserve the right to make such changes in the form, construction and arrangement of parts as will not depart from the spirit of the invention nor the scope of the subjoined claims, as various alterations and modifications may be resorted to in order to adapt the device for use upon different makes and types of motor vehicles.

Having thus described my invention I claim:—

1. In a brake mechanism for motor vehicles, a pair of bars secured upon the frame in transverse relation thereto and parallel to each other and located in advance of the rear axle, a brake cylinder disposed at the longitudinal center line of the frame and secured upon said transverse bars, a compressed air storage tank having valve controlled connection with the rear end of said brake cylinder, a piston within said brake cylinder, a piston rod carried by said piston, a pair of slotted brackets secured upon the frame bars, a draw-bar slidable within said brackets and rigidly secured intermediate its ends to said piston rod, and links having universal connection with the outer ends of said draw-bar and connected with the brake band contracting levers at the rear wheels.

2. In a brake mechanism for motor vehicles including a brake setting device, a storage tank, and a pump for supplying pressure to the tank; means for driving the pump comprising a crank shaft journaled at one side of the frame of the vehicle and connected with the piston of the pump, a shaft extending longitudinally of the frame and operatively connected with said crank shaft, the forward end of said shaft being squared, a roller slidably mounted upon said squared portion and disposed for engagement with the fly wheel of the vehicle motor, said roller having a hub extension provided with an annular groove, and a rod extending through the vehicle dash and having a forked end engaging within said groove whereby said roller may be slid upon its shaft into or out of engagement with the fly wheel.

In testimony whereof I affix my signature.

CHESTER T. ALEXANDER.